United States Patent [19]

Girkin et al.

[11] Patent Number: 5,221,167
[45] Date of Patent: Jun. 22, 1993

[54] SECURITY HEAD ANCHOR

[75] Inventors: Scott A. Girkin; Teddy N. Trainer, both of Charles City, Iowa

[73] Assignee: Diversified Fastening Systems, Inc., Charles City, Iowa

[21] Appl. No.: 915,275

[22] Filed: Jul. 20, 1992

[51] Int. Cl.$^5$ ............................................. F16B 13/06
[52] U.S. Cl. .................................... 411/45; 411/271; 411/954
[58] Field of Search ....................... 411/15, 32, 44, 45, 411/57, 271, 294, 295, 325, 334, 355, 357, 924, 954

[56] References Cited

U.S. PATENT DOCUMENTS

| 2,083,831 | 6/1937 | Cozzens | 411/271 X |
| 3,042,094 | 7/1962 | Liljeberg | 411/271 |
| 4,182,218 | 1/1980 | Combette et al. | 411/57 |
| 4,917,552 | 4/1990 | Crawford | 411/71 X |

FOREIGN PATENT DOCUMENTS

| 502703 | 5/1954 | Canada | 411/57 |
| 2835471 | 2/1980 | Fed. Rep. of Germany | 411/57 |
| 2508991 | 1/1983 | France | 411/57 |
| 522347 | 8/1976 | U.S.S.R. | 411/271 |

Primary Examiner—Rodney M. Lindsey
Attorney, Agent, or Firm—G. Brian Pingel

[57] ABSTRACT

An improved pin drive anchor has an elongated body, a lock nut, and a drive pin having a securing section. The outer end of the body is threaded to permit the lock nut to be threadable therein. When the drive pin is driven into the anchor, the security section is designed so that the outer section of the body is expanded, thereby locking the lock nut onto the anchor.

3 Claims, 2 Drawing Sheets

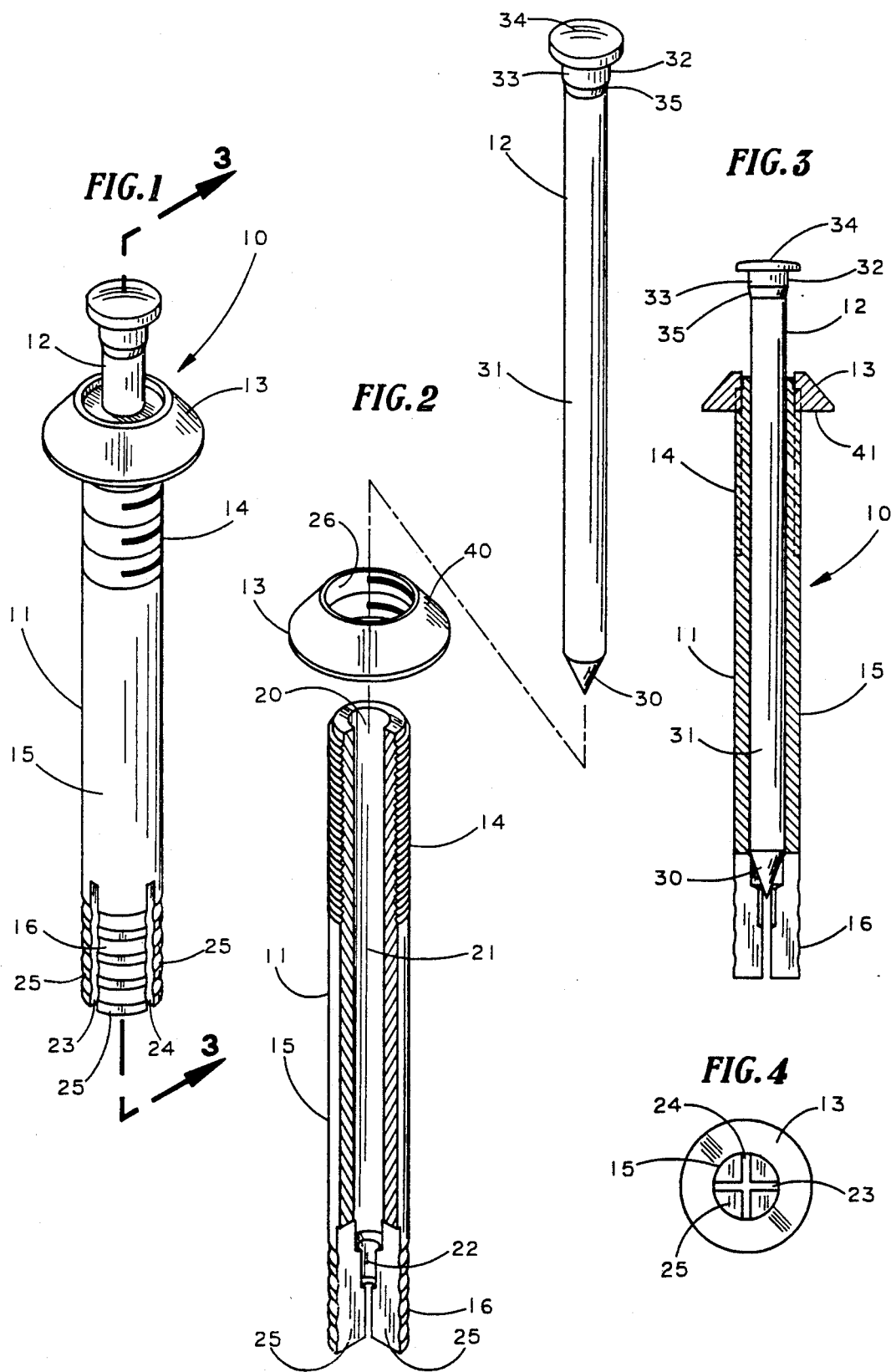

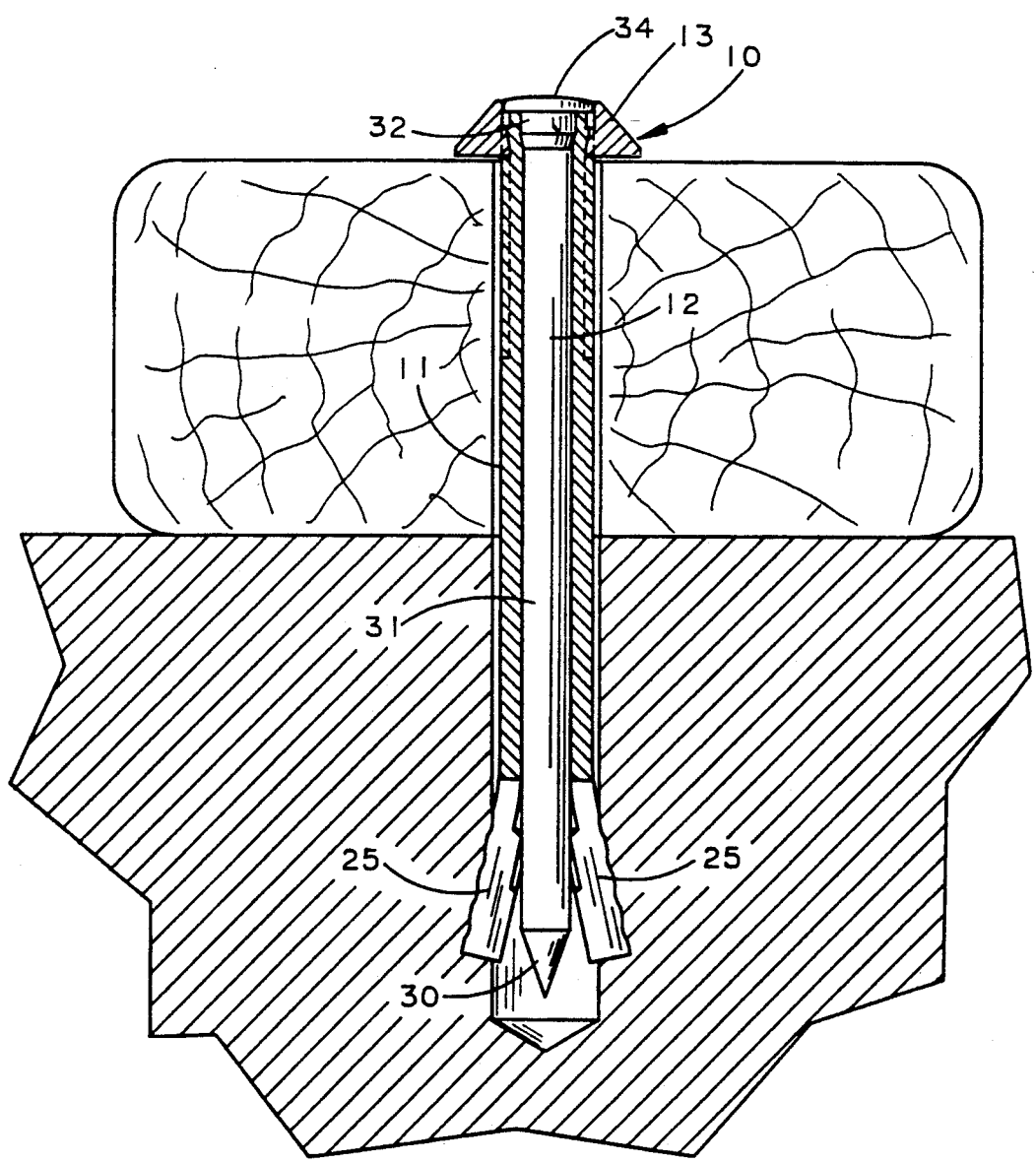

SECURITY HEAD ANCHOR

BACKGROUND OF THE INVENTION

1. Field of the Invention

The present invention relates in general to pin drive anchors for securing various types of articles to masonry or concrete walls, and more specifically relates to an improved construction for such anchors to provide a simple and effective way to permanently secure the articles.

2. Description of the Prior Art

Pin drive anchors have been known in the art for many years and numerous types of anchor constructions are available in the market. The most common type of pin drive anchor construction has a body that is generally uniform in shape with a longitudinally aligned bore that is reduced in diameter near the inner end of the body. The reduced bore of the inner end of the body is bisected with slots. This common design allows the anchors to be secured in a concrete or masonry wall cavity when a pin is driven through the entire length of the bore and thereby expands the inner end within the cavity.

Although the above described common anchor construction has proven to be commercially successful in that it provides an effective means to secure the anchor within a wall, such construction does not provide a satisfactory means to permanently secure the articles to the walls. Typically, the outer portion of the common anchor body is threaded so that when the anchor is secured in the wall, a common nut may be placed thereon with the article to be secured located between the nut and the wall. By tightening the nut, the article becomes rigidly secured onto the wall. However, this design does not provide for a permanent securing because the nut may be intentionally or unintentionally loosened. Accordingly, the present invention with its security head construction provides an improved pin drive anchor which simplifies and strengthens the anchor's ability to permanently secure articles to walls.

SUMMARY OF THE INVENTION

The present invention provides an improved pin drive anchor for permanently securing various types of articles to a masonry or concrete wall. The anchor construction of the present invention includes an elongated body having an axial bore, a lock nut, and a drive pin having a securing section. The body has an outer section with exterior threads which thereby allow the lock nut to be threadable onto the outer end section.

With the nut located on the outer section of the body, the drive pin is then driven into the bore of the anchor, resulting in not only the expansion of the inner end of the body to secure the anchor in the wall, but the securing section of the drive pin also expands the outer section of the anchor body and thereby locks the nut onto the anchor.

BRIEF DESCRIPTION OF THE DRAWINGS

FIG. 1 is a side perspective view of a preferred embodiment of an improved pin drive anchor of the present invention shown together with a drive pin utilized for both securing the anchor into a masonry or concrete wall and for permanently securing a lock nut onto said anchor;

FIG. 2 is an exploded side perspective view of the anchor, pin, and lock nut with a quarter section of the anchor removed to expose interior construction;

FIG. 3 is a cross-section view taken along line 3—3 of FIG. 1;

FIG. 4 is a bottom end view of the anchor shown in FIG. 1;

FIG. 5 is a top end view of the anchor and pin shown in FIG. 1;

FIG. 6 is a cross-section view of the anchor and pin in their operational state with respect to an article and a wall.

DETAILED DESCRIPTION OF THE PREFERRED EMBODIMENT

Beginning with FIG. 1, the present invention provides an improved pin drive metal anchor for securing various types of articles to a masonry or concrete wall (the term "wall" is used herein to refer to any type of masonry or concrete structure). A preferred embodiment of the anchor of the present invention is shown generally at 10 and is comprised of an elongated body 11, a drive pin 12, and a lock nut 13. The anchor 10 is utilized by first passing it through a pre-drilled hole of an article intended to be secured onto a wall and then inserting it into a pre-drilled cavity located in the wall. The pin 12 is then employed to secure both the anchor in the cavity of the wall and the article onto the wall in a manner which will be described below.

Referring now to FIG. 2, the body 11 is integrally formed of three distinct sections; an outer section 14, a middle section 15, and an inner section 16 (the terms "outer" and "inner" are used herein with respect to the position of the sections 14 and 16 when said anchor 10 is installed in a wall). The diameters of all three sections are generally the same but the exterior surfaces differ in that the outer section 14 is threaded, the middle section 15 is smooth, and the inner section 16 is ribbed.

The body 11 also has a longitudinal axially aligned bore 20 formed of a first section 21 and a reduced second section 22. The first section 21 is generally uniform in diameter and extends from the terminus of the outer section 14, through the middle section 15, and to a point just past the beginning of the inner section 16. The second section 22 has a smaller diameter than that of the first section 21 and extends inwardly from the end of said first section 21 towards the terminus of the body 11, ending at a point approximate with the mid-point of the inner section 16. As depicted in both FIG. 1 and FIG. 4, two bisecting slots 23 and 24 cut laterally along the inner section 16 to form four downwardly depending expansion wedges 25.

The lock nut 13 is preferably frusto-conical in shape and has a threaded open center bore 26 which is sized to mate with the outer section 14.

The drive pin 12, as best shown in FIG. 2 and FIG. 3, has a cone shaped nose section 30, a center portion 31, and a head section 32. The center portion 31 is generally uniform in shape and has a diameter slightly smaller than that of the first section 21 yet slightly larger than that of the second section 22. The head section 32 is comprised of, in the preferred embodiment, a securing section 33 having a diameter slightly larger than that of the first section 21, a cap portion 34, and a tapered section 35 located between the center portion 31 and the securing section 33.

To prepare the anchor 10 for use, the lock nut 13, as best shown in FIG. 3, must first be screwed onto the outer section 14 up to a point so that the terminus of the body 11 is slightly recessed thereby forming a receptacle with the open bore 26 and designed to receive the cap portion 34 when said pin 12 is driven into the bore 20. This in turn restricts any attempt to pry the pin 12 loose once the anchor 10 is secured. It should be noted that the nut 13, with its preferred frusto-conical shape, may be placed on the outer section 14 with either its inclined surface 40 or flat surface 41 facing inward, depending upon the article to be secured.

With the lock nut 13 in place, the anchor 10 is then ready to secure a chosen article to a wall. First, the body 11 is passed through a hole in the article and into the wall cavity so that the lock nut 13 abuts against the outer surface of the article. Next, with the anchor 10 in its desired position, the drive pin 12 is then inserted into the first section 21 of the bore 20. The head of the pin 12 is then struck with preferably a hammer to drive the pin 12 into the bore 20. In simultaneous fashion, the nose 30 and the center portion 31 of the pin 12 spread apart the expansion wedges 25 and thereby rigidly secure the anchor 10 in the wall cavity while the securing section 33 of the pin 12 forces the expansion of the outer section 14 encompassed within the lock nut 13 thereby locking said nut 13 and permanently entrapping the article onto the wall.

Thus, the present invention provides a new and improved pin drive anchor 10 for permanently securing various types of articles to masonry or concrete walls. Through the use of the lock nut 13 and the specially designed drive pin 12, the present invention provides a simplistic yet much more efficient and stronger method for permanently securing articles than that provided by prior art devices.

Although a specific preferred embodiment has been shown and described herein, it should be noted by those skilled in the art that modifications and variations can be made to such embodiment without departing from the true spirit and scope of the present invention.

I claim:

1. An anchor for permanently securing various types of articles to a masonry or concrete wall, said anchor comprising;
    (a) an elongated body having:
        (1) an outer generally cylindrical end portion having exterior threads;
        (2) a generally cylindrical center portion;
        (3) an inner generally cylindrical end portion having approximately equally spaced apart slots; and
        (4) a longitudinal axially aligned bore that includes a first section with a generally uniform diameter extending from the free terminus of said outer end portion to a point approximate with said inner end portion and at least a second section that has a diameter smaller than that of said first section and extending inwardly from said first section;
    (b) a nut threadable on the outer end portion of said body;
    (c) a drive pin having:
        (1) a tapered inner end nose section;
        (2) an outer end head section with a securing section that is slightly larger than the diameter of said first section of the longitudinal bore;
        (3) a generally cylindrical midsection having a diameter slightly smaller than the diameter of said first section of said longitudinal bore and extending between said nose and head section; and
    (d) said nut is permanently secured at a desired location on said outer portion of the elongated body when said securing portion of the drive pin is driven into said first section of the longitudinal bore.

2. An anchor as recited in claim 1 wherein said head section further includes a tapered section located between said securing section and midsection and a cap portion extending out past the periphery of said securing section.

3. An anchor as recited in claim 1 wherein said outer end head section is generally cylindrical in shape and has a diameter slightly larger than that of said bore first section.

* * * * *